(12) United States Patent
Gong et al.

(10) Patent No.: US 9,002,339 B2
(45) Date of Patent: Apr. 7, 2015

(54) CONSUMPTION AND CAPTURE OF MEDIA CONTENT SENSED FROM REMOTE PERSPECTIVES

(75) Inventors: Michelle X. Gong, Sunnyvale, CA (US); Wei Sun, San Jose, CA (US); Kenneth T. Anderson, Portland, OR (US); Horst W. Haussecker, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 13/586,718

(22) Filed: Aug. 15, 2012

(65) Prior Publication Data

US 2014/0049659 A1 Feb. 20, 2014

(51) Int. Cl.
 H04M 3/00 (2006.01)
 H04N 5/232 (2006.01)
 H04N 5/247 (2006.01)
 H04N 7/18 (2006.01)

(52) U.S. Cl.
 CPC ........... *H04N 5/23206* (2013.01); *H04N 5/247* (2013.01); *H04N 7/18* (2013.01)

(58) Field of Classification Search
 CPC ......... G08C 2201/93; H04M 1/72533; H04M 1/7253
 USPC .......................................... 455/418, 419, 420
 See application file for complete search history.

(56) References Cited

U.S. PATENT DOCUMENTS

2006/0026649 A1* 2/2006 Shieh ............................... 725/62
2007/0254640 A1* 11/2007 Bliss ............................. 455/420
2008/0297608 A1* 12/2008 Border et al. ............ 348/207.11
2010/0214398 A1 8/2010 Goulart et al.
2011/0110229 A1* 5/2011 Himayat et al. ............... 370/230

FOREIGN PATENT DOCUMENTS

JP 2005-278018 A 10/2005
JP 2008-199460 A 8/2008
JP 2012-023463 A 2/2012

OTHER PUBLICATIONS

"Samsung Galaxy S III hands-on with device-exclusive sharing", www.slashgear.com/samsung-galaxy-s-iii-hands-on-with-device-exclusive-sharing-20235000/, 7 pages.
International Search Report & Written Opinion mailed Nov. 22, 2013 for International Application No. PCT/US2013/053260, 10 pages

* cited by examiner

*Primary Examiner* — Omoniyi Obayanju
(74) *Attorney, Agent, or Firm* — Schwabe, Williamson & Wyatt, P.C.

(57) ABSTRACT

Embodiments of apparatus, packages, computer-implemented methods, systems, devices, and computer-readable media (transitory and non-transitory) are described herein for enabling a first mobile device to control a second mobile device, to enable media content sensed from a perspective of the second mobile device to be consumed using the first mobile device or captured by the second mobile device under control of the first mobile device. In various embodiments, control may include provision of one or more commands to the second mobile device using at least a persistent communication link between the first and second mobile devices. In various embodiments, control may further include receipt of at least a view of media content currently sensed by the second mobile device using a stateless communication protocol. In various embodiments, the first mobile device may control more than one remote mobile devices.

28 Claims, 6 Drawing Sheets

CONSUMPTION AND CAPTURE OF MEDIA CONTENT SENSED FROM REMOTE PERSPECTIVES

FIELD

Embodiments of the present invention relate generally to the technical field of data processing, and more particularly, to consumption and capture of media content sensed from remote perspectives.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

With advances in integrated circuit, computing, networking and related technologies, mobile devices are now commonly available, and are used by many users in various contexts. Mobile devices, including but not limited to smart phones, digital cameras, and tablet computers, are now generally capable of capturing media content such as audio, photos and/or video.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
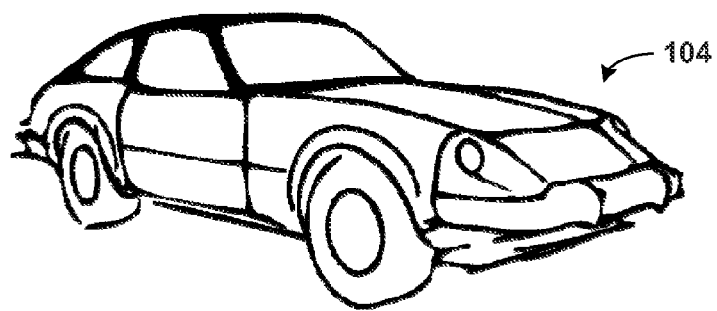
FIG. 1 schematically illustrates an example scenario in which two mobile devices sense media content, each from its own perspective, in accordance with various embodiments.
Figure 1:
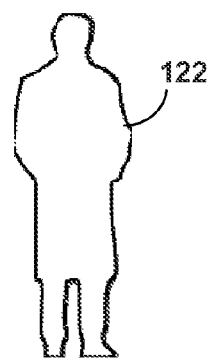
Figure 1:
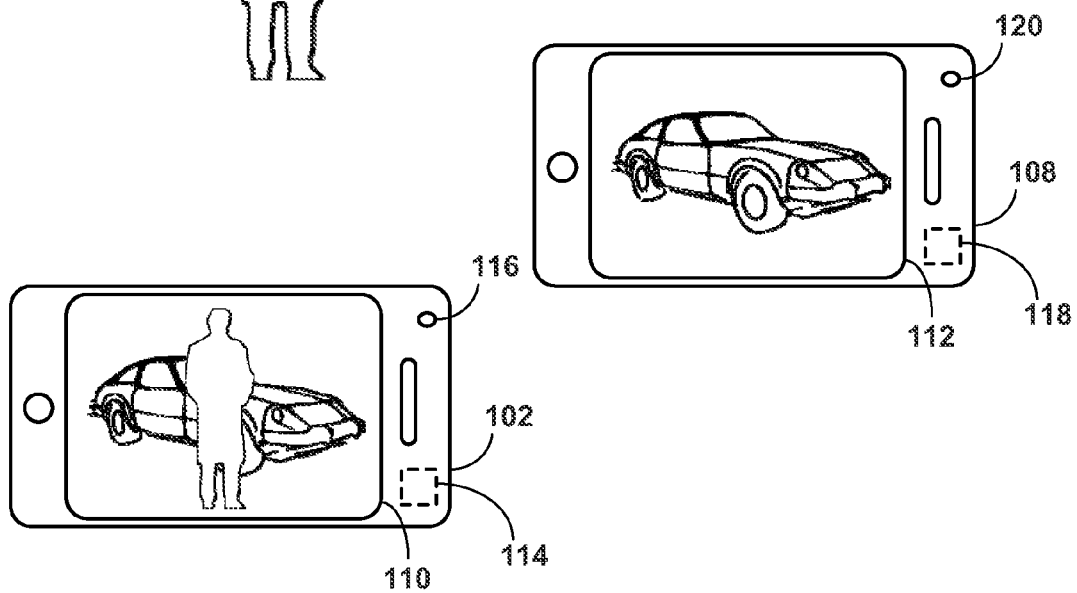

Apparatuses, methods and storage medium associated with enhanced mobile device user experience are disclosed herein. In embodiments, images or video may be captured from multiple perspectives of multiple cameras, and used for various purposes. For example, multiple views captured by multiple cameras may be combined into more complex media, such as a panoramic picture or a three-dimensional image or video. Additionally or alternatively, multiple camera views may be employed to track a moving object such as a ball on a soccer field. For instance, views of the moving object from multiple cameras may be analyzed to determine which view is "best" at a given point in time. Using such analysis, it may be possible to assemble a unified video that switches between the "best" camera view as the object moves about to track the object. These and other embodiments are further described below.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, a first mobile device 102 used by a first user (not shown) may have a first perspective of an event or object 104. A second mobile device 108 operated by a second user (not shown) may have a second, different perspective of object 104.

In various embodiments, first mobile device 102 and/or second mobile device 108 may be a smart phone, tablet computer, digital camera, or any other mobile electronic device capable of communicating directly with other mobile electronic devices, e.g., directly and wirelessly. In various embodiments, first mobile device 102 may include an output device such as a touch screen display 110. Second mobile device 108 likewise may include an output device such as a touch screen display 112. While touch screen displays are shown in FIG. 1, this is not meant to be limiting. Mobile devices may have other types of output devices for consumption of media content, such as non-touch screen displays (sometimes referred to as "viewfinders"), speakers, and so forth.

First mobile device 102 may also include one or more input devices. For instance, first mobile device 102 may include first camera 114, which is shown in dashed lines in FIG. 1 because it is physically located on a side of first mobile device 102 opposite the side visible in FIG. 1. In various embodiments, first mobile device 102 may include a second, front-facing camera 116. Equipping mobile devices with cameras on both sides may allow users to switch views between cameras, e.g., for video chat. Any other mobile device described or contemplated herein may be similarly equipped. For instance, second mobile device 108 may include its own first camera 118 (on the side opposite the visible side) and second camera 120. Media content sensed by either camera may be consumed or captured by remote mobile devices, as will be discussed below.

In FIG. 1, a person 122 is positioned between first mobile device 102 and object 104. As a result, in touch screen display 110, person 122 partially obstructs a view of object 104 captured by first camera 114. In order to obtain an unobstructed view of object 104, first mobile device 102 could be moved to a different location. However, moving may not be feasible. For instance, the user of first mobile device 102 could be a spectator at an event with assigned seating. Even if the view from first mobile device 102 were not obstructed by person 122, the view may nonetheless not be optimal, e.g., far away from an event or a current location of an object of interest (e.g., a ball in a sporting event).

Accordingly, in various embodiments, first mobile device 102 may be configured to control other mobile devices in the vicinity, to enable consumption of media content sensed by these other mobile devices, and/or capture of media content by those other mobile devices under the control of first mobile device 102. For instance, first mobile device 102 may control second mobile device 108 to enable media content sensed from a perspective of second mobile device 108 to be consumed using the first mobile device 102, or captured by second mobile device 108 under control of first mobile device 102.

In various embodiments, first mobile device 102 may be configured to discover other mobile devices in the area (e.g., at a sporting event) that are configured to share media content, such as second mobile device 108. First mobile device 102 may transmit a multicast message, such as a multicast Domain Name system ("mDNS") message, that may be received by other mobile devices in the area, such as second mobile device 108. The multicast message may include various information, such as that first mobile device 102 has an input device (e.g., first camera 114) available for sharing, and/or that first mobile device 102 wishes to control other mobile devices in the area to enable media content sensed by those devices to be consumed using first mobile device 102, or captured by the mobile devices under control of first mobile device 102.

Once first mobile device 102 discovers other suitably-configured mobile devices in the area, first mobile device 102 may establish persistent communication links with those mobile devices. In various embodiments, those persistent communication links may be maintained until various events occur, such as the mobile devices losing contact with each other (e.g., going out of range) or a mobile device indicating that it no longer is available to be controlled to enable consumption or capture of media content sensed by its input device (e.g., if its battery is low). In various embodiments, e.g., where mobile devices communicate using WiFi Direct, a "persistent" communication link may be established using a connection-oriented protocol, such as the Transmission Control Protocol ("TCP"). Additionally and/or alternatively, a persistent communication link may be established and maintained by using periodic "keep alive," or "Hello," messages, as described below.

Figure 2:
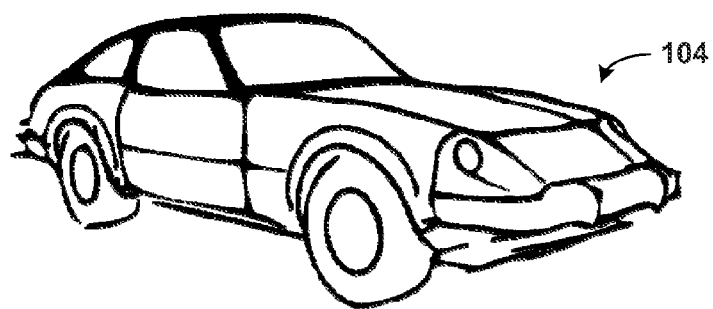
FIG. 2 schematically illustrates the example scenario of FIG. 1, where one of the mobile devices provides for consumption media content sensed from a perspective of the other mobile device, in accordance with various embodiments.
Figure 2:
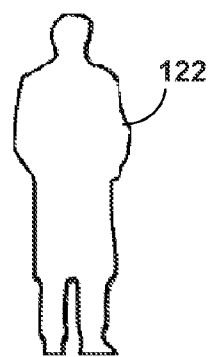
Figure 2:
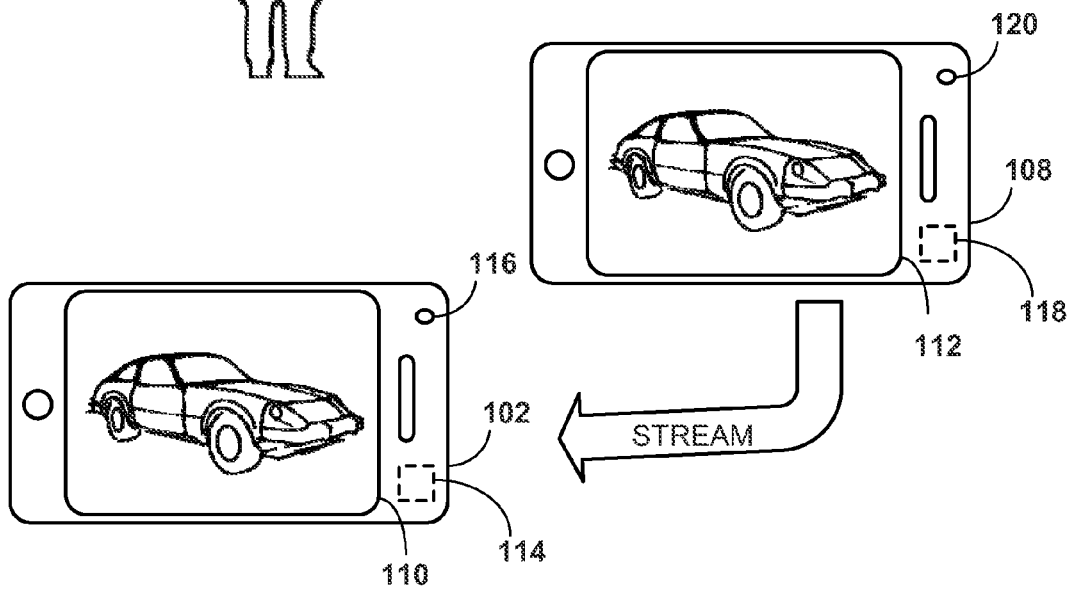

Once first mobile device 102 has established a persistent communication link with second mobile device 108, first mobile device 102 may control second mobile device 108 to enable media content sensed from a perspective of second mobile device 108 to be consumed using first mobile device 102, and to be captured under control of first mobile device 102. An example of this is seen in FIG. 2. Media content sensed by second mobile device 108 may be streamed to and displayed on first mobile device 102 in real time. This provides the user of first mobile device 102 an unobstructed view of object 104. In various embodiments, the user of first mobile device 102 may see essentially the same view that may be viewable on touch screen display 112 of second mobile device 108. In various embodiments, the view of media content may be streamed from second mobile device 108 to first mobile device 102 using, e.g., one or more of the real time protocol ("RTP"), real time streaming protocol ("RTSP"), and/or real time control protocol ("RTCP") over a stateless communication protocol such as the User Datagram Protocol ("UDP").

In various embodiments, first mobile device 102 may (e.g., in response to user input) provide, e.g., using the persistent communication link, one or more commands to second mobile device 108. In various embodiments, these commands may include camera control commands (e.g., activate camera, modify flash settings, adjust focus, etc.) and other commands. In various embodiments, camera control commands may be sent using a camera control protocol, an example of which is discussed in more detail below. Other commands, such as commands for control of video streaming, may be sent using other protocols, such as RTSP.

For example, first mobile device 102 may provide one or more camera control commands, such as a "trigger" command, to activate first camera 118 or second camera 120 of second mobile device 108. Once first camera 118 or second camera 120 is activated, and media content sensed by first camera 118 or second camera 120 is available for streaming, first mobile device 102 may issue real-time video streaming commands such as start, stop, or pause, to second mobile device 108, e.g., using RTSP, to respectively, start, stop or pause streaming by second mobile device 108. The streamed video from the second device 108 may be displayed on the first device 102 such that, in effect, the user of the first device 102 is able to "see" through the lens of the second mobile device 108. If a user of first mobile device 102 wishes to alter the appearance of the captured media, the user may operate an interface on first mobile device 102 (e.g., one or more icons on touch screen display 110) to cause first mobile device 102 to issue camera control commands to second mobile device 108, e.g., to alter parameters of camera(s) (e.g., 118, 120) of second mobile device 108.

Figure 3:
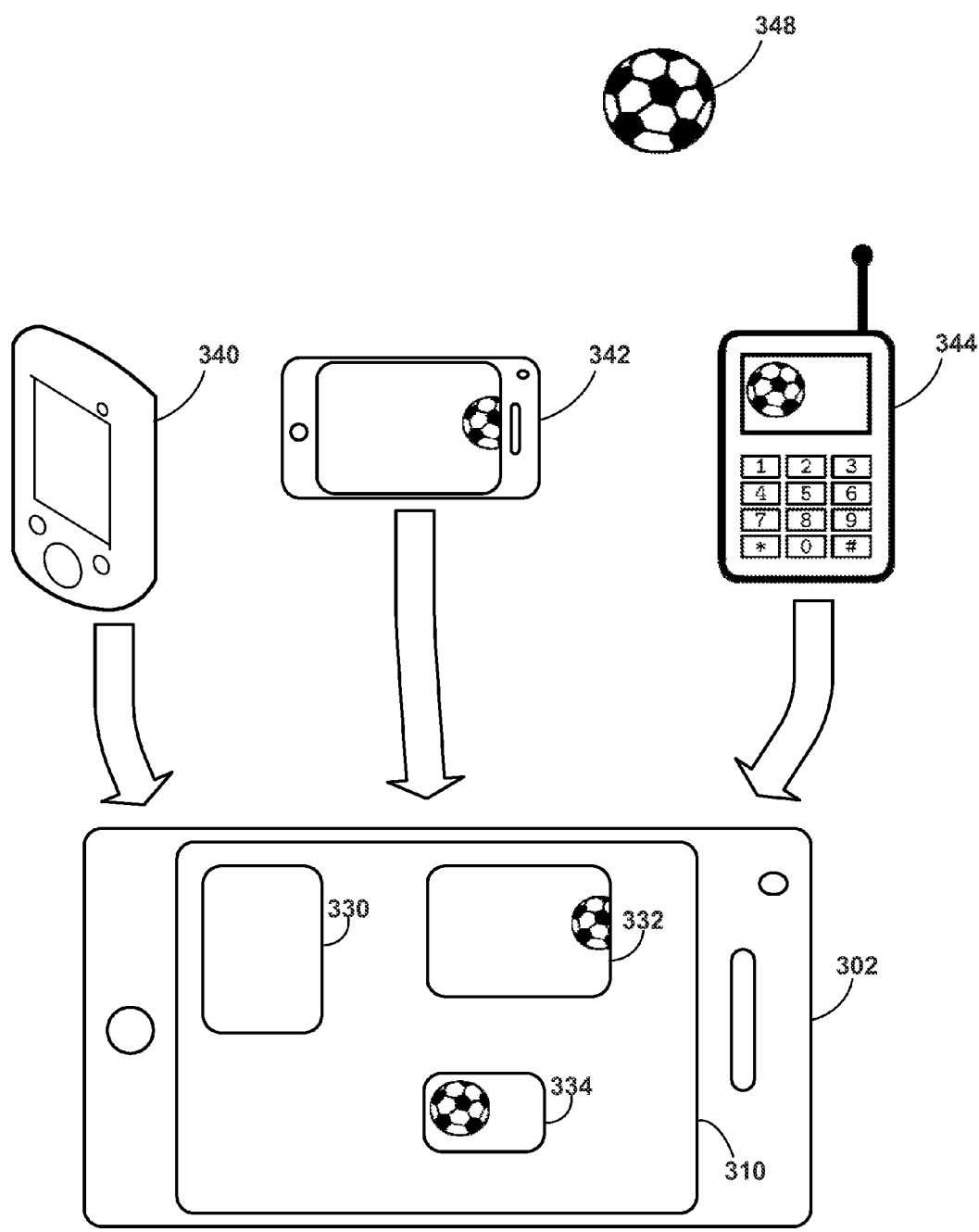
FIG. 3 schematically illustrates an example scenario in which a first mobile device provides for consumption media content sensed by three other remote mobile devices, in accordance with various embodiments.

In various embodiments, mobile devices may be configured to enable media content sensed from perspectives of multiple other mobile devices to be consumed locally and/or captured under local control. An example of this is shown in FIG. 3, in which four mobile devices are held by spectators at a soccer match. Each mobile device has a different perspective of a soccer ball 348. It may be assumed that the devices have all discovered each other, and that persistent communication links between them have been established.

A touch screen display 310 of a first mobile device 302 is shown simultaneously displaying media content views 330, 332 and 334, from three remote mobile devices 340, 342, and 344, respectively. In various embodiments, first mobile device 302 may be configured to position the views 330, 332 and 334 on touch screen display 310 in a manner that suggests the remote mobile devices' physical locations relative to first mobile device 302. In various embodiments, relative positions of the multiple mobile devices relative to one another may also be calculated.

In various embodiments, first mobile device 302 may be configured to select from these multiple views a view which will be displayed prominently in touch screen display 310, e.g., based on various criteria or in response to various events. For example, first mobile device 302 may be configured to select, for consumption, media content sensed from the perspective of second mobile device 340, the perspective of third mobile device 342, or the perspective of fourth mobile device 344. This selection may be performed in various ways.

For example, first mobile device 302 may be configured to automatically select media content from the one or more mobile devices with the best view of a particular event or object, such as soccer ball 348. In various embodiments, this may be done in real time, so that a user of first mobile device 302 may track the ball. First mobile device 302 may be configured to receive, e.g., from a user as input, the user's interest, such as an object to track, e.g., soccer ball 348. First mobile device 302 may receive multiple streams of views of the soccer ball from multiple other mobile devices in the vicinity (with which persistent communication links are established). First mobile device 302 may use various algorithms to analyze the user's interest, the scenes contained in the streams, and/or the progress of the event (e.g., soccer game) to provide the user with the best current view of the ball, much in the same way a broadcast of a sporting event may transition between views from multiple cameras. In various embodiments, the algorithms may utilize various data, such as the relative positions of the multiple mobile devices, to perform this analysis. In various embodiments, the algorithms may be used to track any object or event of interest (e.g., a ball, a player, an attempt to score a goal, etc.). In various embodiments, a user of first mobile device 302 may also manually select, from multiple views provided by multiple mobile devices, a particular view the user wishes to consume.

Referring back to FIGS. 1-2, in various embodiments, the user of first mobile device 102 may wish to obtain a more permanent and/or higher resolution version of media content sensed from the perspective of second mobile device 108. In such case, first mobile device 102 may be further configured to control second mobile device 108 to enable media content sensed from a perspective of second mobile device 108 to be captured by second mobile device 108 under control of first mobile device 102.

For example, a "record" icon may be rendered on touch screen display 110, e.g., superimposed over streamed media content received from second mobile device 108 in real time. A user may press this button at first mobile device 102 to issue a command to second mobile device 108, e.g., over the persistent communication link, to initiate (or terminate) recordation of media content into memory of second mobile device 108. This recorded media content may be provided by second mobile device 108 to first mobile device 102, e.g., via the already-established persistent communication link or another on-demand connection-oriented communication link.

In various embodiments, the streamed view of media content sensed by second mobile device 108 and consumed at first mobile device 102 may have a resolution that is lower than a recordation resolution employed by second mobile device 108 to record the media content. Accordingly, the recorded media content may be transmitted from second mobile device 108 to first mobile device 102 at a later time, e.g., using a connection-oriented protocol.

In some embodiments, a single mobile device may act as a "master device" to a plurality of "slave" devices. For instance, in FIG. 3, first mobile device 302 may act as a master device to consume media content sensed by and/or control second mobile device 340, third mobile device 342 and/or fourth mobile device 344. In such embodiments, first mobile device 302 may be configured to maintain a list of connected devices. Should one of the slave devices fail to respond to a periodic "Hello" message, first mobile device 302 may remove that remote mobile device from its list of connected devices. If the slave device comes back online or within range again, first mobile device 302 may automatically discover it (e.g., using mDNS) and add it back to its list of connected devices.

In various embodiments, a mobile device may be configured to combine recorded media content sensed from perspectives of multiple mobile devices, for various purposes. For instance, the mobile device may be configured to combine multiple still images or video frames into a three-dimensional view or a panoramic view. Additionally, and similar to above, the mobile device may be configured to receive the multiple media contents and combine them in a way that enables a continuous "best view" of an object, e.g., a soccer ball.

Figure 4:
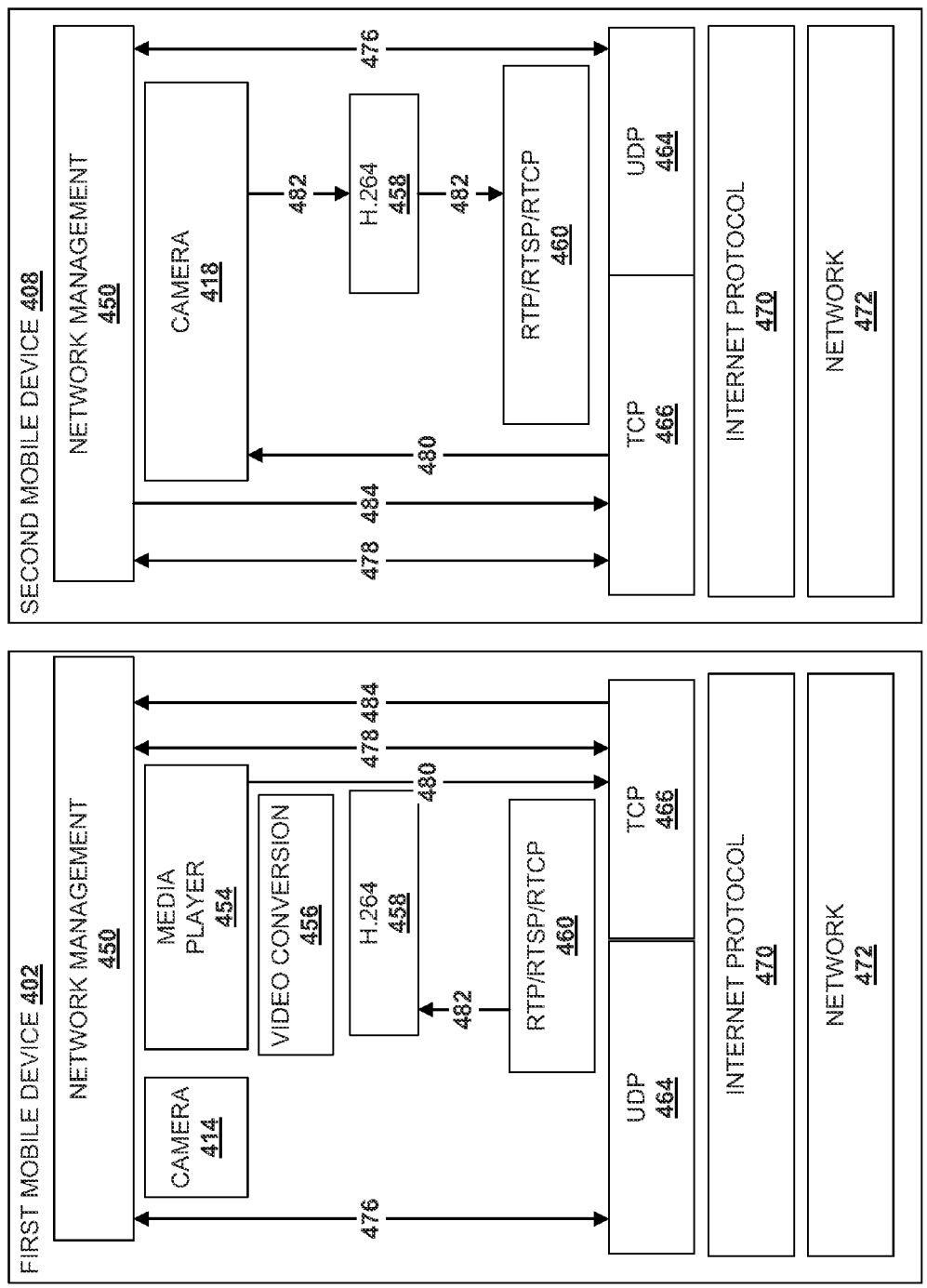
FIG. 4 schematically illustrates example protocol stacks that may be implemented on mobile devices, in accordance with various embodiments.

FIG. 4 schematically depicts example protocol stacks that may be implemented by a first mobile device 402 and a second mobile device 408, in accordance with various embodiments. In this example, for ease of understanding, each mobile device includes similar components, and therefore those components are identified using the same reference numbers. However, this is not meant to be limiting, and multiple mobile devices having different components may nevertheless share media content using disclosed techniques.

First mobile device 402 may include a network management component 450 for performing actions such as discovering other mobile devices, maintaining persistent communication links with discovered mobile devices, establishing other communication links (e.g., connection-oriented links and/or stateless links), transmitting and receiving sensed and/or captured media content, and so forth.

First mobile device 402 may also include a camera 414, a media player component 454 (e.g., to render graphics on a touch screen display), a video conversion component 456, a video codec component 458, which in this example is configured to operate in accordance with the H.264/MPEG-4 Part 10 Advanced Video Coding ("AVC") standard, and an RTSP/RTCP/RTP layer 460.

Below these components may be communication layers, such as a UDP layer 464 for providing "stateless" communication links, a TCP layer 466 for providing connection-oriented and/or persistent communication links, an Internet protocol ("IP") layer 470, and a network layer 472. In various embodiments, network layer 472 may be used to send and receive commands and data through a cellular network, a wireless local area network ("WLAN") such as Wi Fi, Wi Fi Direct, and so forth. In various embodiments, mobile devices may additionally or alternatively exchange commands and data using Bluetooth or other similar technologies. In various embodiments, these direct communications may or may not utilize other communication layers such as TCP or UDP.

A non-limiting example of how various communications may be routed between first mobile device 402 and second mobile device 408 is demonstrated by arrows in FIG. 4, in accordance with various embodiments. Communications relating to mobile device discovery, such as mDNS communications, may be exchanged between first mobile device 402 and second mobile device 408 using the protocol stack through which arrow 476 traverses. This may include, on both first mobile device 402 and second mobile device 408, network management 450, a stateless communication protocol such as UDP component 464, IP layer 470, and network layer 472.

First mobile device 402 and second mobile device 408 may be configured to exchange various network maintenance messages, e.g., to maintain a persistent communication link with each other. For instance, first mobile device 402 and second mobile device 408 may be configured to periodically exchange "Hello" messages, e.g., via the path shown by arrow 478 (e.g., from network management through TCP/IP). In other scenarios, such as where mobile devices maintain persistent Bluetooth communication links, periodic "Hello" messages may be exchanged via other communication stacks (not shown). If second mobile device 408 fails to timely respond to a pre-defined number of "Hello" messages from first mobile device 402 (or vice versa), the persistent communication link established between the devices after discovery may be taken down.

In various embodiments, such as the embodiment shown in FIG. 4, camera operation commands and/or RTSP commands may be exchanged along the path shown by arrow 480, from media player component 454 (e.g., user presses record icon on touch screen), through TCP/IP. In other scenarios, such as where Bluetooth or other forms of communication links are used instead, these commands may be exchanged along a different path (not shown). These commands may be received by second mobile device 408 and processed in reverse, after which they may arrive at camera 418 of second mobile device 408. Responsive to those commands, second mobile device 408 may perform various operations, such as to start, stop or pause video streaming, or to perform operations on camera 418, such as operating a flash, altering a focus, and so forth. Second mobile device 408 may operate camera 414 of first mobile device 402 through a similar communication path, but in reverse.

In various embodiments, camera operation commands may be exchanged in their own protocol, separate from traditional RTSP commands such as start, pause and stop. In various embodiments, a camera control protocol may be defined to include the following fields:

Frame Type|Frame Length|Frame Body

In various embodiments, the Frame Type field may be one octet in length, the Frame Length field may be two octets, and the Frame Body may be variable length. The commands may also take any other formats.

Media content sensed by one mobile device may be streamed in real time along the path traversed by arrow 482. For instance, second mobile device 408 may operate its camera 418 to sense media content from a perspective of second mobile device 408. In various embodiments, video frames captured by camera 418 may be converted, e.g., by H.264 component 458, to a format suitable for streaming. Once converted, the data may be sent over RTP/UDP/IP to first mobile device 402. First mobile device 402 may receive this data via IP/UDP/RTP. First mobile device 402 may then convert the data, e.g., using video conversion component 456, from the format in which it was received, e.g., at H.264 component 458, to another format suitable for display by media player component 454, e.g., in the YUV color space.

As noted above, recorded media content may have a higher resolution than streamed real time media content. Accordingly, in various embodiments, the recorded media content may be distributed non-contemporaneously with its recordation, e.g., via the path indicated by arrow 484. For example, second mobile device 408 may transfer recorded media content to first mobile device 402 via a connection-oriented communication link. In various embodiments, it may be the same as or different than the persistent communication link used by first mobile device 402 to provide commands to second mobile device 408.

Figure 5:
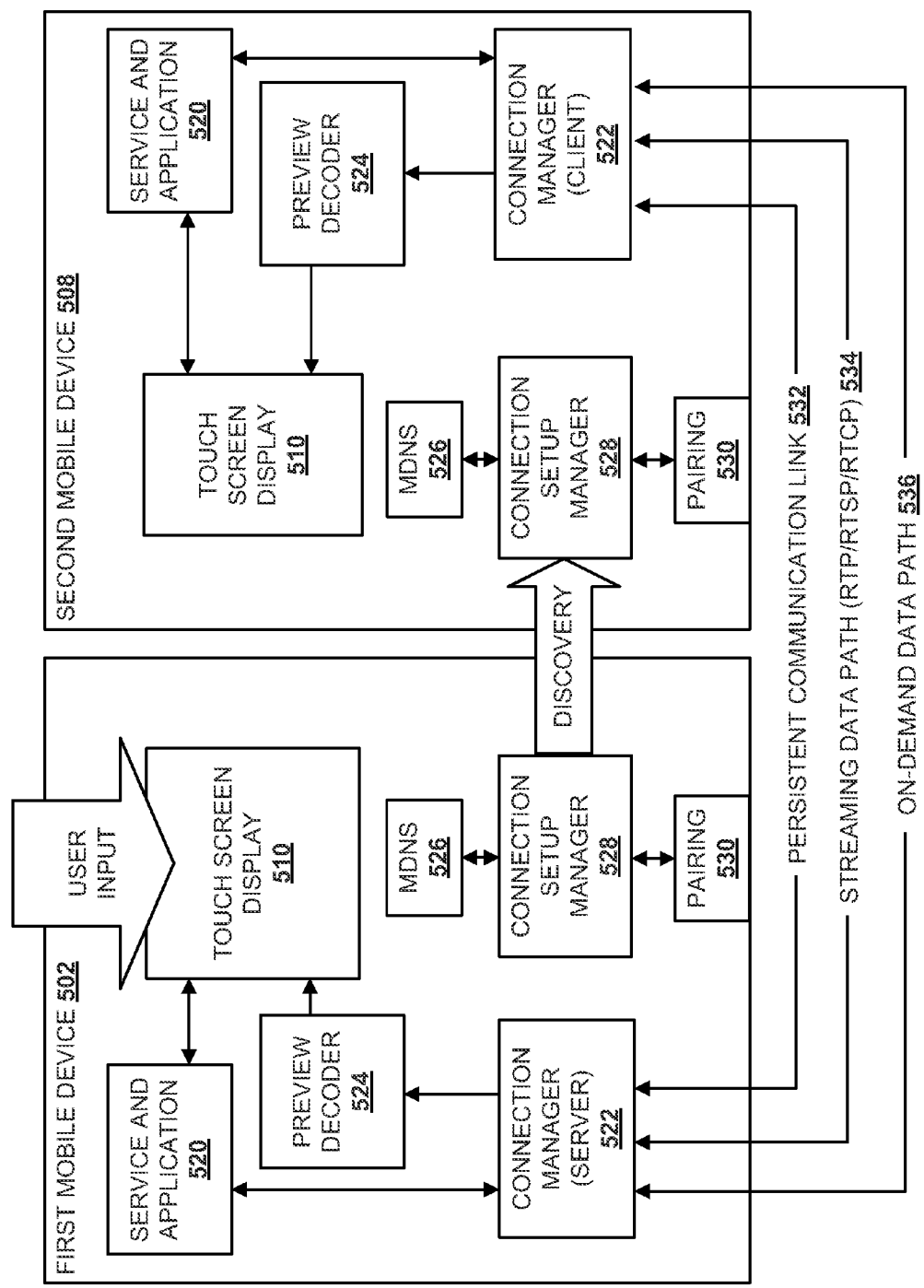
FIG. 5 schematically illustrates example software and hardware components that may be implemented on mobile devices, in accordance with various embodiments.

Example hardware and software components that may be implemented on mobile devices are shown in FIG. 5. Once again a first mobile device 502 and a second mobile device 508, which may be similar to mobile devices of FIGS. 1-4, are depicted. In this example, first mobile device 502 is acting as a "master," or "server," to control second mobile device 508 acting as a "slave" or "client," but the opposite could be true. In alternate embodiments, the first and second mobile devices 502 and 508 may be peer devices to each other.

Each mobile device includes a touch screen display 510, but this is not meant to be limiting, and in some embodiments, a mobile device may include a non-interactive display (e.g., a view finder on a camera or cell phone) and separate input controls. Each mobile device may also include a service and application component 520, a connection manager 522, a preview decoder 524, an mDNS component 526, a connection setup manager 528, and a pairing component 530. Although shown separately in FIG. 5, in various embodiments, one or more of these components may be omitted and/or integrated with other components.

In various embodiments, service and application component 520 may maintain global states of various components and data structures. It may also coordinate and/or control actions performed by other components in FIG. 5. For instance, service and application component 520 may perform actions similar to those described above in connection with network management component 450 of FIG. 4.

In various embodiments, connection setup manager 528 on first mobile device 502 may operate with mDNS component 526 to discover second mobile device 508, as indicated by the block arrow in FIG. 5. Upon discovery, a persistent communication link 532, which in various embodiments may include transmission over a connection-oriented protocol such as TCP, may be established between connection manager 522 (acting as server in this example) on first mobile device 502 and connection manager 522 (acting as client in this example) on second mobile device 508. Persistent communication link 532 may persist until first mobile device 502 or second mobile device 508 terminates the link, e.g., by travelling out of range or via a user shutting the link down manually. As noted above, persistent communication link 532 may be used to exchange various RTSP and/or camera control commands. In various embodiments, persistent communication link 532 may be established in whole or in part by pairing component 530, which may be configured to implement a secure pairing procedure.

When first mobile device 502 transmits a command to second mobile device 508 to provide streaming media content from the perspective of second mobile device 508 (e.g., in response to user input as shown by the "USER INPUT" arrow in FIG. 5), a streaming data path 534 may be established between first mobile device 502 and second mobile device 508. As noted above, streaming data path 534 may be sent using a stateless protocol (e.g., UDP), and may carry RTP and/or RTCP traffic. Media content streaming over streaming data path 534 may, in some embodiments, have a resolution that is suitable for display on a typical mobile device display. Because such displays are often small, the resolution may be relatively low, which may also be suitable for streaming wirelessly in real time. Once received at first mobile device 502, streamed media content may be sent to preview decoder 524, which may decode the data and/or convert it to a form (e.g., YUV color space) suitable for rendering on touch screen display 510.

A separate, on-demand data path 536 may be established between first mobile device 502 and second mobile device 508 when, e.g., first mobile device 502 provides a command to second mobile device 508 to record media content. For instance, a user of first mobile device 502 viewing streamed media content from the perspective of second mobile device 508 may decide to record a portion of the content. A command may be sent to second mobile device 508, e.g., via persistent communication link 532, to initiate recordation of media content. Second mobile device 508 (e.g., using its connection setup manager 528) may then establish on-demand data path 536, immediately or some time later. As noted above, this recorded media content may have a higher resolution than the real-time streamed media content transmitted over streaming data path 534, and so it might be more convenient later, e.g., when there is more bandwidth available, to transfer the recorded media content. In various embodiments, on-demand data path 536 may be established using a connection-oriented protocol, such as TCP.

Figure 6:
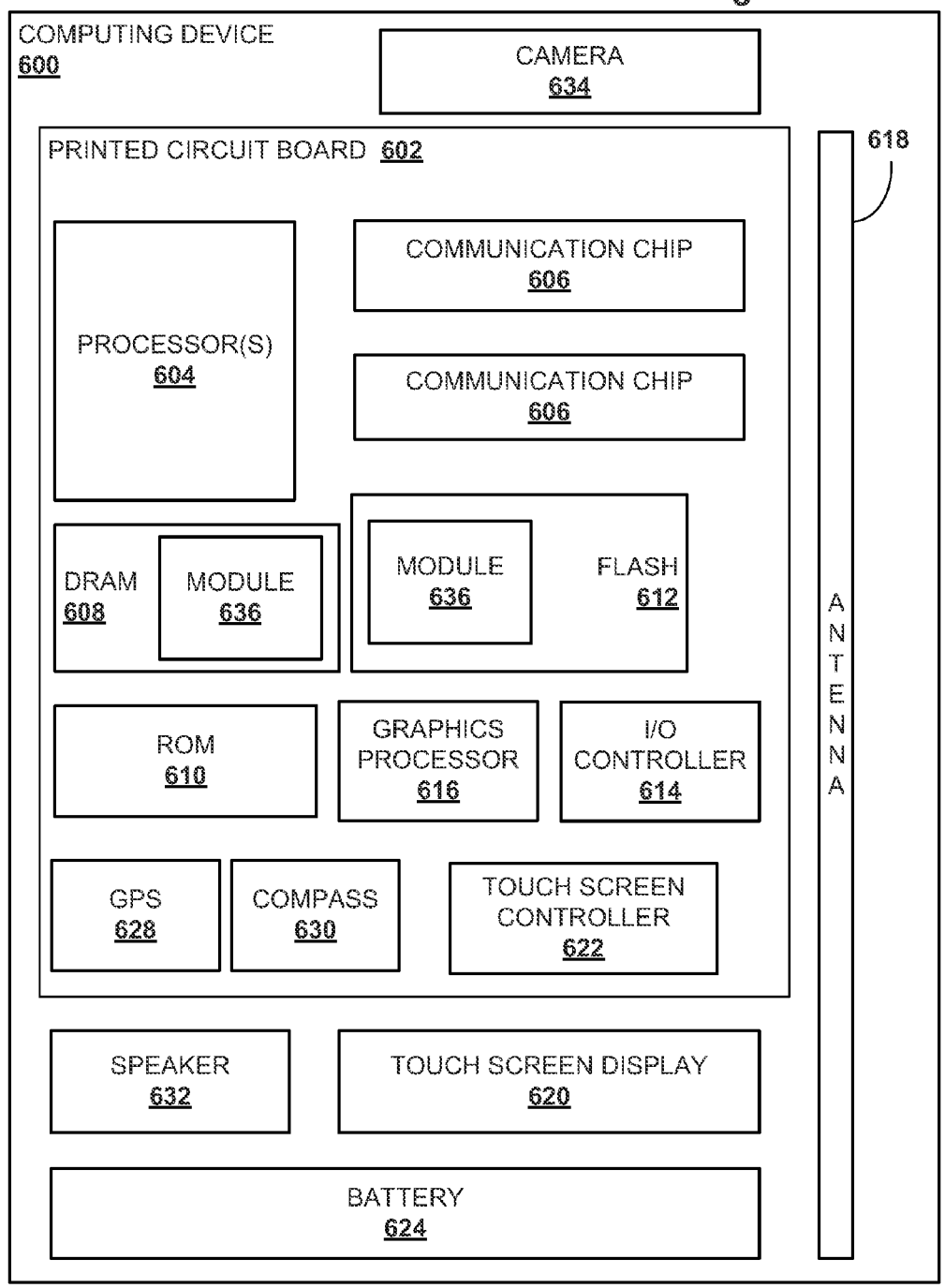
FIG. 6 schematically depicts an example computing device on which disclosed methods and computer-readable media may be implemented, in accordance with various embodiments.

FIG. 6 illustrates an example computing device 600, in accordance with various embodiments. Computing device 600 may include a number of components, a processor 604 and at least one communication chip 606. In various embodiments, the processor 604 may be a processor core. In various embodiments, the at least one communication chip 606 may also be physically and electrically coupled to the processor 604. In further implementations, the communication chip 606 may be part of the processor 604. In various embodiments, computing device 600 may include a printed circuit board ("PCB") 602. For these embodiments, processor 604 and communication chip 606 may be disposed thereon. In alternate embodiments, the various components may be coupled without the employment of PCB 602.

Depending on its applications, computing device 600 may include other components that may or may not be physically and electrically coupled to the PCB 602. These other components include, but are not limited to, volatile memory (e.g., dynamic random access memory 608, also referred to as "DRAM"), non-volatile memory (e.g., read only memory 610, also referred to as "ROM"), flash memory 612, an input/output controller 614, a digital signal processor (not shown), a crypto processor (not shown), a graphics processor 616, one or more antenna 618, a display (not shown), a touch screen display 620, a touch screen controller 622, a battery 624, an audio codec (not shown), a video codec (not shown), a global positioning system ("GPS") device 628, a compass 630, an accelerometer (not shown), a gyroscope (not shown), a speaker 632, a camera 634, and a mass storage device (such as hard disk drive, a solid state drive, compact disk ("CD"), digital versatile disk ("DVD"))(not shown), and so forth. In various embodiments, the processor 604 may be integrated on the same die with other components to form a System on Chip ("SoC").

In various embodiments, volatile memory (e.g., DRAM 608), non-volatile memory (e.g., ROM 610), flash memory 612, and the mass storage device may include programming instructions configured to enable computing device 600, in response to execution by processor(s) 604, to implement all or selected aspects of the techniques and communications shown in FIGS. 4 and 5. For example, one or more of the memory components such as volatile memory (e.g., DRAM 608), non-volatile memory (e.g., ROM 610), flash memory 612, and the mass storage device may include temporal and/or persistent copies of instructions that, when executed, enable computing device 600 to operate a module 636 configured to implement all or selected aspects of the techniques and communications shown in FIGS. 4 and 5. Module 636 may, e.g., be a callable function of an application (not shown), a system service of an operating system (not shown), and so forth. In alternate embodiments, module 636 may be a co-processor or an embedded microcontroller.

The communication chips 606 may enable wired and/or wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to IEEE 802.16 ("WiMAX"), IEEE 602.20, Long Term Evolution ("LTE"), General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3 G, 4 G, 5 G, and beyond. The computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

In various implementations, the computing device 600 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 600 may be any other electronic device that processes data.

Embodiments of apparatus, packages, computer-implemented methods, systems, devices, and computer-readable media (transitory and non-transitory) are described herein for enabling a first mobile device to control a second mobile device to enable media content sensed from a perspective of the second mobile device to be consumed using the first mobile device or captured by the second mobile device under control of the first mobile device. In various embodiments, control may include provision of one or more commands to the second mobile device using at least a persistent communication link between the first and second mobile devices. In various embodiments, control may further include receipt of at least a view of media content currently sensed by the second mobile device using a stateless communication protocol.

In various embodiments, provision of one or more commands may include provision of a command to the second mobile device, using the persistent communication link, to activate an image capture device of the second mobile device. In various embodiments, provision of one or more commands may further include provision of a command to the second mobile device, using the persistent communication link, to activate a flash associated with the image capture device, or to cause the image capture device to record a still image or one or more video frames. In various embodiments, provision of one or more commands may include provision of a command to the second mobile device, using the persistent communication link, to stream the view of media content currently sensed by the second mobile device to the first mobile device using the stateless communication protocol. In various embodiments, the streamed view of media content may be encoded. In various embodiments, the first mobile device may be further configured to invoke a decoder of the first mobile device to decode the streamed view of media content.

In various embodiments, the view of media content may be streamed using RTSP over the stateless communication protocol. In various embodiments, provision of one or more commands to the second mobile device may further include provision of one or more of a start, a stop, or a pause command to the second mobile device, using the RTSP, to respectively, start, stop or pause streaming by the second mobile device.

In various embodiments, provision of one or more commands may further include provision of a command to the second mobile device, using the persistent communication link, to initiate recordation of media content sensed by the second mobile device, or provision of a command to the second mobile device, using the persistent communication link, to terminate recordation of media content sensed by the second mobile device. In various embodiments, the streamed view of media content may have a resolution that is lower than a recordation resolution employed by the second mobile device to record the media content.

In various embodiments, provision of one or more commands may further include provision of a command to the second mobile device, using the persistent communication link, to provide recorded media content to the first mobile device using a connection-oriented communication protocol. In various embodiments, receipt may further comprise receipt of the recorded media content using the connection-oriented communication protocol. In various embodiments, the first mobile device may further be configured to transmit or receive one or more multicast communications to discover the second mobile device.

In various embodiments, the first mobile device may be further configured to control a third mobile device to enable media content sensed from a perspective of the third mobile device to be consumed using the first mobile device or captured by the third mobile device under control of the first mobile device. In various embodiments, control of the third mobile device may include provision of one or more commands to the third mobile device using at least a persistent communication link between the first and third mobile devices. In various embodiments, control may additionally or alternatively include receipt of at least a view of media content currently sensed by the third mobile device using a stateless communication protocol. In various embodiments, the first mobile device may be further configured to automatically select, for consumption, the media content sensed from the perspective of the second mobile device, the media content sensed from the perspective of the third mobile device, or both.

In addition to controlling another device, a mobile device may be controlled. For instance, in various embodiments, a first mobile device may be configured to be controlled by a second mobile device to enable media content sensed from a perspective of the first mobile device to be consumed using the second mobile device or captured by the first mobile device under control of the second mobile device. In various embodiments, to be controlled may include receipt of one or more commands from the second mobile device using at least a persistent communication link between the first and second mobile devices. In various embodiments, the first mobile device may be further configured to provision of at least a view of media content currently sensed by the first mobile device using a stateless communication protocol.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The invention claimed is:

1. At least one non-transitory computer-readable medium comprising instructions that, in response to execution by a first mobile device, cause the first mobile device to:
    receive a control input; and
    in response to receipt of the control input, control a second mobile device to enable media content sensed from a perspective of the second mobile device to be consumed using the first mobile device or captured by the second mobile device under control of the first mobile device, wherein control includes:
        provision of one or more commands to the second mobile device using at least a persistent communication link between the first and second mobile devices,
        receipt, at a first resolution, of a first view of media content currently sensed by the second mobile device using a stateless communication protocol layer in as protocol stack of the first mobile device, wherein the stateless communication protocol layer is disposed above an internet protocol layer and a network layer in the protocol stack, and
        receipt, at a second resolution higher than the first resolution, of a second view of the media content using a connection-oriented communication protocol layer in the protocol stack of the first mobile device, wherein the connection-oriented communication protocol layer is disposed above the internet protocol layer and the network layer in the protocol stack, and wherein the connection-oriented communication protocol layer is different from the stateless communication protocol layer.

2. The at least one non-transitory computer-readable medium of claim 1, wherein provision of one or more commands includes provision of a command to the second mobile device, using the persistent communication link, to activate an image capture device of the second mobile device.

3. The at least one non-transitory computer-readable medium of claim 2, wherein provision of one or more commands further includes provision of a command to the second mobile device, using the persistent communication link, to activate a flash associated with the image capture device, or to cause the image capture device to record a still image or one or more video frames.

4. The at least one non-transitory computer-readable medium of claim 1, wherein provision of one or more commands includes provision of a command to the second mobile device, using the persistent communication link, to stream the first view of media content currently sensed by the second mobile device to the first mobile device using a stateless communication protocol layer in a protocol stack of the second mobile device.

5. The at least one non-transitory computer-readable medium of claim 4, wherein the streamed first view of media content is encoded, and wherein the instructions, in response to execution of the instructions by the first mobile device, further cause the first mobile device to invoke a decoder of the first mobile device to decode the streamed first view of media content.

6. The at least one non-transitory computer-readable medium of claim 4, wherein the first view of media content is streamed from the second mobile device using a real time streaming protocol ("RTSP") over the stateless communication protocol layer in the protocol stack of the second mobile device, and wherein provision of one or more commands to the second mobile device further includes provision of one or more of a start, a stop, or a pause command to the second mobile device, using the RTSP, to respectively, start, stop or pause streaming by the second mobile device.

7. The at least one non-transitory computer-readable medium of claim 4, wherein provision of one or more commands further includes provision of a command to the second mobile device, using the persistent communication link, to initiate recordation of media content sensed by the second mobile device, or provision of a command to the second mobile device, using the persistent communication link, to terminate recordation of media content sensed by the second mobile device.

8. The at least one non-transitory computer-readable medium of claim 7, wherein the streamed first view of the media content has a resolution that is lower than a recordation resolution employed by the second mobile device to record the media content.

9. The at least one non-transitory computer-readable medium of claim 7, wherein provision of one or more commands further includes provision of a command to the second mobile device, using the persistent communication link, to provide the second view of the media content to the first mobile device using a connection-oriented communication protocol layer of a protocol stack of the second mobile device, the second view of the media content comprises recorded media content, and receipt further comprises receipt of the recorded media content using the connection-oriented communication protocol layer of the protocol stack of the first mobile device.

10. The at least one non-transitory computer-readable medium of claim 1, wherein the instructions, in response to execution by the first mobile device, cause the first mobile device to transmit or receive one or more multicast communications to discover the second mobile device.

11. The at least one non-transitory computer-readable medium of claim 1, wherein the instructions, in response to execution by the first mobile device, further cause the first mobile device to:
receive a second control input; and
in response to receipt of the second control input, control a third mobile device to enable media content sensed from a perspective of the third mobile device to be consumed using the first mobile device or captured by the third mobile device under control of the first mobile device, wherein control of the third mobile device includes provision of one or more commands to the third mobile device using at least a persistent communication link between the first and third mobile devices, and receipt of at least a view of media content currently sensed by the third mobile device using the stateless communication protocol layer.

12. The at least one non-transitory computer-readable medium of claim 11, wherein the instructions, in response to execution by the first mobile device, further cause the first mobile device to automatically select, for consumption, the media content sensed from the perspective of the second mobile device, the media content sensed from the perspective of the third mobile device, or both.

13. At least one non-transitory computer-readable medium comprising instructions that, in response to execution of the instructions by a first mobile device, cause the first mobile device to be controlled by a second mobile device to enable media content sensed from a perspective of the first mobile device to be consumed using the second mobile device or captured by the first mobile device under control of the second mobile device, wherein to be controlled includes:
receipt of one or more commands from the second mobile device using at least a persistent communication link between the first and second mobile devices,
provision, at a first resolution, of a first view of media content currently sensed by the first mobile device using a stateless communication protocol layer in a protocol stack of the first mobile device, wherein the stateless communication protocol layer is disposed above an internet protocol layer and a network layer in the protocol stack, and
provision, at a second resolution higher than the first resolution, of a second view of the media content using a connection-oriented communication protocol layer in the protocol stack of the first mobile device, wherein the connection-oriented communication protocol layer is disposed above the Internet protocol layer and the network layer in the protocol stack, and wherein the connection-oriented communication protocol layer is different from the stateless communication protocol layer.

14. The at least one non-transitory computer-readable medium of claim 13, wherein the instructions, in response to execution by the first mobile device, cause the first mobile device to activate an image capture device of the first mobile device responsive to a command from the second mobile device received using the persistent communication link.

15. The at least one non-transitory computer-readable medium of claim 14, wherein the instructions, in response to execution by the first mobile device, cause the first mobile device to activate a flash associated with the image capture device, or to cause the image capture device to record a still image or one or more video frames, responsive to a command from the second mobile device received using the persistent communication link.

16. The at least one non-transitory computer-readable medium of claim 13, wherein the instructions, in response to execution by the first mobile device, cause the first mobile device to stream the first view of media content currently sensed by the first mobile device to the second mobile device using the stateless communication protocol layer, responsive to a command from the second mobile device received using the persistent communication link.

17. The at least one non-transitory computer-readable medium of claim 16, wherein the instructions, in response to execution by the first mobile device, further cause the first mobile device to invoke an encoder of the first mobile device to encode the media content.

18. The at least one non-transitory computer-readable medium of claim 16, wherein the instructions, in response to execution by the first mobile device, cause the first mobile device to stream the first view of the media content using a real time streaming protocol ("RTSP") over the stateless communication protocol layer, and to start, stop or pause streaming responsive to one or more of a start, a stop, or a pause command, respectively, received from the second mobile device using the RTSP.

19. The at least one non-transitory computer-readable medium of claim 16, wherein the instructions, in response to execution by the first mobile device, cause the first mobile device to initiate or terminate recordation of media content sensed by the first mobile device, responsive to a command from the second mobile device received using the persistent communication link.

20. The at least one non-transitory computer-readable medium of claim 19, wherein the first resolution is lower than a recordation resolution employed by the first mobile device to record the media content.

21. The at least one non-transitory computer-readable medium of claim 19, wherein the instructions, in response to execution by the first mobile device, cause the first mobile device to provide the second view of the media content to the second mobile device using the connection-oriented communication protocol layer, responsive to a command from the second mobile device received using the persistent communication link, wherein the second view of the media content comprises recorded media content.

22. The at least one non-transitory computer-readable medium of claim 13, wherein the instructions, in response to execution by the first mobile device, further cause the first mobile device to:
receive a control input; and
in response to receipt of the control input, control a third mobile device to cause media content sensed from a perspective of the third mobile device to be consumed using the first mobile device or captured by the third mobile device under control of the first mobile device, wherein control of the third mobile device includes provision of one or more commands to the third mobile device using at least a persistent communication link between the first and third mobile devices, and receipt of at least a view of media content currently sensed by the third mobile device using a stateless communication protocol layer in a protocol stack of the third mobile device, wherein the stateless communication protocol layer is disposed above an internet protocol layer and a network layer in the protocol stack of the third mobile device.

23. A system, comprising:
one or more processors;
a memory operably coupled to the processor; and
a module configured to be operated with or by the one or more processors to:
control a remote mobile device to enable media content sensed from a perspective of the remote mobile device to be consumed using the system or captured by the remote mobile device under control of the system, wherein control includes:
provision of one or more commands to the remote mobile device using at least a persistent communication link between the system and the remote mobile device,
receipt, at a first resolution, of at least a streamed view of media content currently sensed by the remote mobile device using a stateless communication protocol layer in a protocol stack of the system, wherein the stateless communication protocol layer is disposed above an internet protocol layer and a network layer in the protocol stack, and
receipt, at a second resolution higher than the first resolution, of a second view of the media content using a connection-oriented communication protocol layer in the protocol stack of the system, wherein the connection-oriented communication protocol layer is disposed above the internet protocol layer and the network layer in the protocol stack and, wherein the connection-oriented communication protocol layer is different from the stateless communication protocol layer.

24. The system of claim 23, wherein provision of one or more commands includes provision of a command to the remote mobile device, using the persistent communication link, to activate an image capture device of the remote mobile device, to activate a flash associated with the image capture device, or to cause the image capture device to record a still image or one or more video frames.

25. The system of claim 23, further comprising a touch screen display.

26. The at least one non-transitory computer-readable medium of claim 1, wherein receipt of the second view of the media content using a connection-oriented communication protocol layer different from the stateless communication protocol layer comprises receipt of the second view of the media content using an on-demand communication link different from the persistent communication link.

27. The at least one non-transitory computer-readable medium of claim 13, wherein provision of the second view of the media content using a connection-oriented communication protocol layer different from the stateless communication protocol layer comprises provision of the second view of the media content using an on-demand communication link different from the persistent communication link.

28. The system of claim 23, wherein receipt of the second view of the media content using a connection-oriented communication protocol layer different from the stateless communication protocol layer comprises receipt of the second view of the media content using an on-demand communication link different from the persistent communication link.

* * * * *